US012667032B2

(12) United States Patent
Matter et al.

(10) Patent No.: US 12,667,032 B2
(45) Date of Patent: Jun. 30, 2026

(54) AGRICULTURAL IMPLEMENTS HAVING ROW UNITS WITH ROTATING SUPPORTS

(71) Applicant: AGCO do Brasil Soluções Agrícolas Ltda., Ribeirao Preto (BR)

(72) Inventors: Jarlis Luiz Matter, Ibirubá (BR); Venicius Damo Cunha, Não Me Toque (BR); Leandro Burghausen, Ibirubá (BR)

(73) Assignee: AGCO do Brasil Soluções Agrícolas Ltda., Jundiaí (BR)

( * ) Notice: Subject to any disclaimer, the term of this patent is extended or adjusted under 35 U.S.C. 154(b) by 469 days.

(21) Appl. No.: 17/814,425

(22) Filed: Jul. 22, 2022

(65) Prior Publication Data

US 2023/0056543 A1 Feb. 23, 2023

(30) Foreign Application Priority Data

Aug. 18, 2021 (GB) ..................................... 2111844

(51) Int. Cl.
   *A01B 49/02*      (2006.01)
   *A01B 35/28*      (2006.01)
           (Continued)

(52) U.S. Cl.
   CPC ............ *A01B 49/027* (2013.01); *A01B 35/28* (2013.01); *A01B 63/32* (2013.01); *A01C 5/06* (2013.01); *A01B 51/04* (2013.01)

(58) Field of Classification Search
   CPC ........... A01C 7/08; A01C 7/201; A01C 7/205; A01C 5/06; A01C 5/064; A01B 49/027; A01B 35/28; A01B 63/32
   See application file for complete search history.

(56) References Cited

U.S. PATENT DOCUMENTS 176,963 A * 5/1876 Johnson ................. A01B 13/16
                              172/136
389,259 A * 9/1888 Spradlin ............... E02F 3/7604
                              172/136

(Continued)

FOREIGN PATENT DOCUMENTS

EP         3772266 A1    2/2021

OTHER PUBLICATIONS

UK Intellectual Property Office, Search report for related UK Application No. GB2111844.3, dated Feb. 10, 2022; 4 pages.

*Primary Examiner* — Christopher J Sebesta
*Assistant Examiner* — Audrey L Lusk

(57) ABSTRACT

An agricultural implement includes a frame carrying a toolbar, and row units coupled to the toolbar. Each row unit includes a tool support and a rotating support coupled to the tool support and configured to rotate about an axis of rotation. Ground-engaging tools are carried by the rotating support and extending outward from the axis of rotation. Rotation of the rotating support about the axis of rotation moves the ground-engaging tools around the rotating support to change which of the ground-engaging tools interacts with the ground. A method of adjusting the agricultural implement includes disengaging the row units from a ground surface, rotating at least one rotating support about a corresponding axis of rotation to move the ground-engaging tools around the rotating support, and re-engaging the row units with the ground surface.

16 Claims, 3 Drawing Sheets

(51) Int. Cl.
  *A01B 63/32*    (2006.01)
  *A01C 5/06*     (2006.01)
  *A01B 51/04*    (2006.01)

(56)       References Cited

U.S. PATENT DOCUMENTS

| | | | | |
|---|---|---|---|---|
| 1,036,215 | A * | 8/1912 | Fry | A01B 61/048 |
| | | | | 172/136 |
| 1,341,231 | A * | 5/1920 | Hamilton | A01B 49/02 |
| | | | | 172/136 |
| 1,346,701 | A * | 7/1920 | Cochran | A01B 3/02 |
| | | | | 172/136 |
| 1,652,012 | A * | 12/1927 | Johnson | A01B 15/06 |
| | | | | 172/136 |
| 2,518,051 | A | 8/1950 | Nelson | |
| 2,575,428 | A * | 11/1951 | Rogers | A01B 3/44 |
| | | | | 172/162 |
| 3,104,123 | A * | 9/1963 | Newkirk | A01B 21/08 |
| | | | | 172/445.2 |
| 4,090,456 | A * | 5/1978 | Morrison, Jr. | A01C 11/006 |
| | | | | 111/140 |
| 4,168,749 | A * | 9/1979 | Adams | A01B 1/06 |
| | | | | 172/136 |
| 4,648,334 | A * | 3/1987 | Kinzenbaw | A01C 7/08 |
| | | | | 172/776 |
| 5,094,299 | A * | 3/1992 | Freier | A01B 59/067 |
| | | | | 172/136 |
| 6,827,029 | B1 * | 12/2004 | Wendte | A01C 7/042 |
| | | | | 111/185 |
| 8,528,655 | B1 * | 9/2013 | Sterchi | A01B 21/04 |
| | | | | 172/136 |
| 2016/0338256 | A1 * | 11/2016 | Campbell | A01B 63/22 |
| 2017/0000003 | A1 * | 1/2017 | Dienst | A01C 7/163 |

* cited by examiner

AGRICULTURAL IMPLEMENTS HAVING ROW UNITS WITH ROTATING SUPPORTS

CROSS-REFERENCE TO RELATED APPLICATION

This application claims the benefit of the filing date of U. K. Patent Application 2111844.3, "Agricultural Implements Having Row Units with Rotating Supports," filed Aug. 18, 2021, the entire disclosure of which is incorporated herein by reference.

FIELD

Embodiments of the present disclosure relate generally to agricultural implements, and in particular, implements having row units for working fields in rows.

BACKGROUND

Agricultural implements with a plurality of row units are used to plant seeds and/or dispense fertilizer upon or in the ground. Pull-type implements may have a central portion pulled by a tractor, and may have wings extending from either side. The individual row units, mounted to the center section or to a wing, typically deliver seeds or fertilizer into separate rows. The row units may receive seed from a common hopper. Other implements having row units may include tillage tools, such as shanks, coulter wheels, etc. Implements may be used in a variety of different fields and conditions, and so row units may be changed from one type to another to accommodate different circumstances.

BRIEF SUMMARY

In one embodiment, an agricultural implement includes a frame carrying a toolbar. The agricultural implement also includes a plurality of row units coupled to the toolbar, and each row unit includes a tool support and a rotating support coupled to the tool support. The rotating support is configured to rotate about an axis of rotation relative to the tool support. A plurality of ground-engaging tools are carried by the rotating support and extending outward from the axis of rotation. Rotation of the rotating support about the axis of rotation moves the ground-engaging tools around the rotating support.

A method of adjusting the agricultural implement includes disengaging the row units from a ground surface, rotating at least one rotating support about a corresponding axis of rotation to move the ground-engaging tools around the rotating support, and re-engaging the row units with the ground surface.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any agricultural implement or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those structures necessary to understand the embodiments of the disclosure are described in detail below. Additional conventional structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

Figure 1:
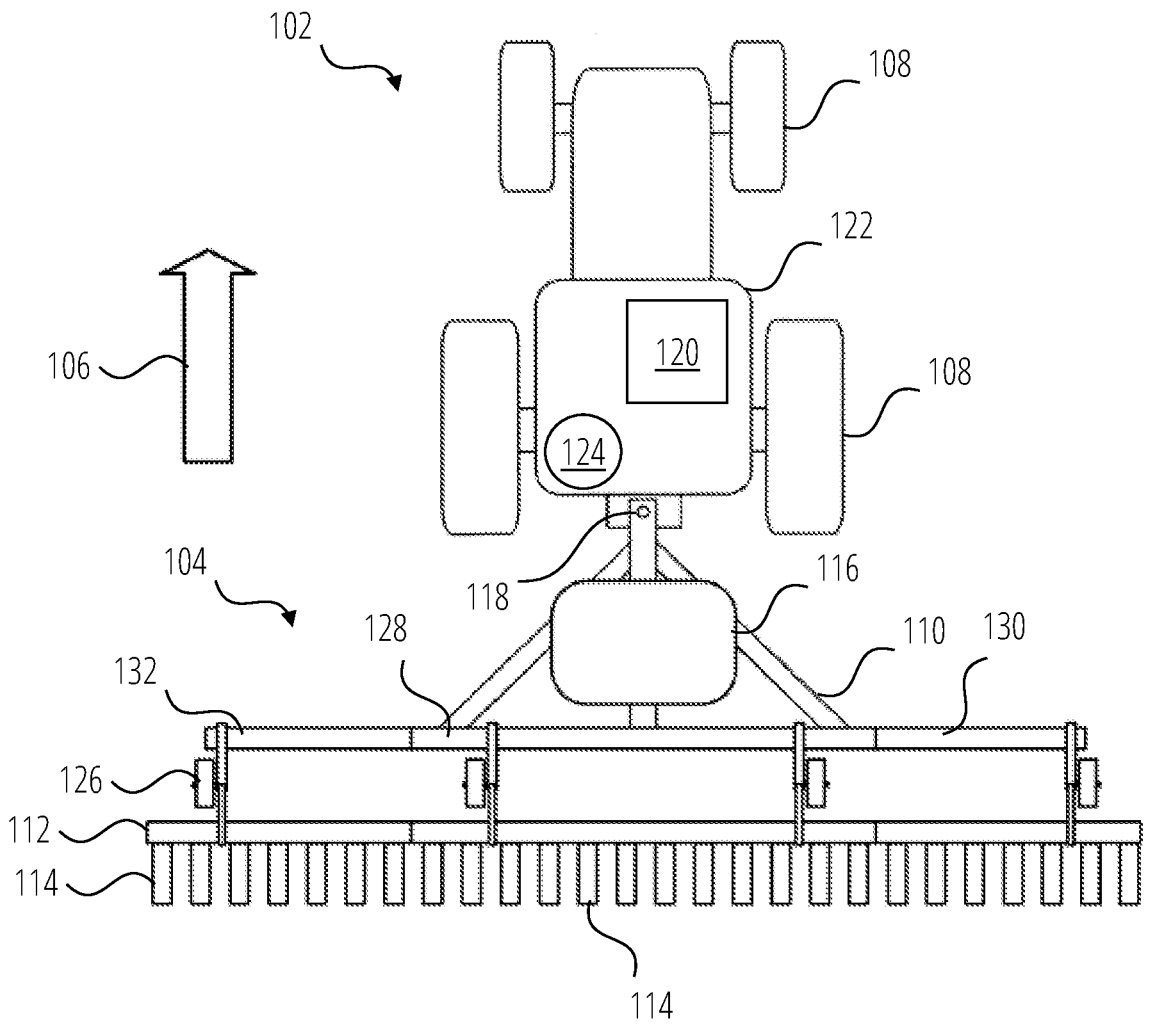
FIG. 1 is a simplified top view of a tractor pulling an implement in accordance with one embodiment.

FIG. 1 illustrates a tractor 102 drawing an agricultural implement 104 in a forward direction 106. The tractor 102 has wheels 108, an engine, a chassis, and other elements as known in the art. The implement 104 has a frame 110 carrying a toolbar 112 supporting row units 114. The row units 114 may be connected to a central hopper 116 containing seed to be planted and/or fertilizer to be applied. The implement 104 is connected to the tractor 102 by a tow hitch 118. A computer 120, which may include a central processing unit ("CPU"), memory, implement controller, and graphical user interface ("GUI") (e.g., a touch-screen interface), is typically located in an operator cabin 122 of the tractor 102. A global positioning system GPS receiver 124 may be mounted to the tractor 102 and connected to communicate with the computer 120. The implement controller is configured to communicate with the row units 114 and/or the GPS receiver 124, such as by wired or wireless communication.

The implement 104 may be supported in the field by at least one wheel 126 coupled to the frame 110. The frame 110 may include a first section 128 (e.g., a center section) configured to be towed by the tractor 102, and one or more wing sections 130, 132 hingedly coupled to the first section 128. For example, and as shown in FIG. 1, the first section 128 may be a center section, and two wing sections 130, 132 may be attached to opposite sides thereof. The wing sections 130, 132 may fold for transport or storage, and unfold (as shown in FIG. 1) for planting, fertilizing, or other field operations. Typically, the wheels 126 may support any or all of the wing sections 130, 132. In other embodiments, the center section 128 may be omitted, and two wing sections 130, 132 may be connected directly to one another.

Figure 2:
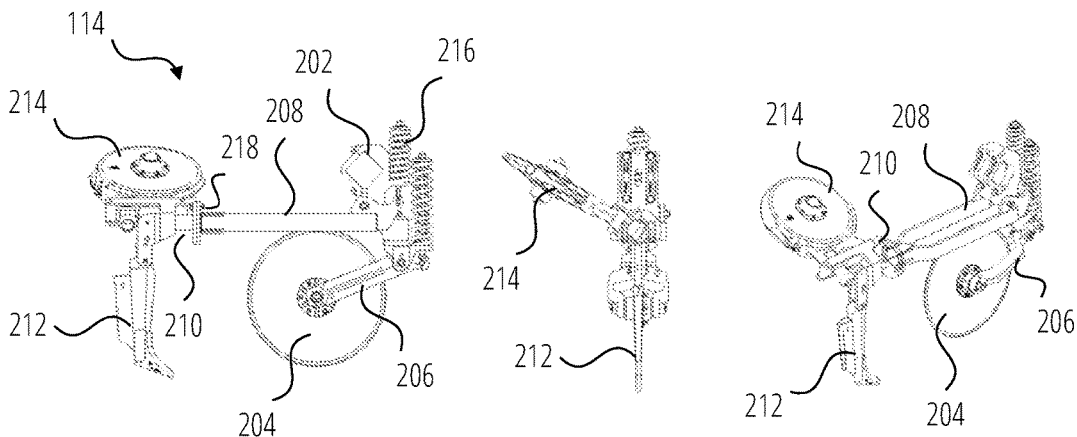
FIG. 2 illustrates, in three simplified views (a side view, a rear view, and a perspective), a row unit that may be carried by the implement shown in FIG. 1.

FIG. 2 illustrates, in three simplified views (a side view, a rear view, and a perspective), an individual row unit 114 that may be carried by the toolbar 112. Each row unit 114 has a row unit frame 202 having a tool support 208 attached thereto. The row unit frame 202 may be configured to attach to the toolbar 112. For example, as shown in the side view of FIG. 2, the row unit frame 202 may have a square opening to attach to the toolbar 112 (shown in FIG. 1). The tool support 208 may be coupled to the row unit frame 202 by a spring 216 or other element to control rotation of the tool support 208. For example, the spring 216 may be configured such that a tool attached to the tool support 208 exerts a preselected downforce, or is at a preselected depth relative to the ground surface. An opener disc 204 may be connected to the row unit frame 202 by an opener disc arm 206, which may also be coupled to the row unit frame 202 by a spring 216. In some embodiments, the springs 216 may be metal springs, air springs, actuators, etc.

The tool support 208 carries a rotating support 210 that is rotatably coupled to the tool support 208 such that the rotating support 210 can rotate about an axis of rotation generally aligned in a forward-to-back direction of the implement 104. The rotating support 210 may have one or more ground-engaging tools attached to it that may be selectively engaged with the ground, such as a shank 212 and a double-disc 214. In the configuration shown in FIG. 2, the shank 212 engages the ground behind the opener disc 204. The double-disc 214 is oriented upward and to the left in the configuration shown in FIG. 2, and as such, it does not engage the ground.

Figure 3:
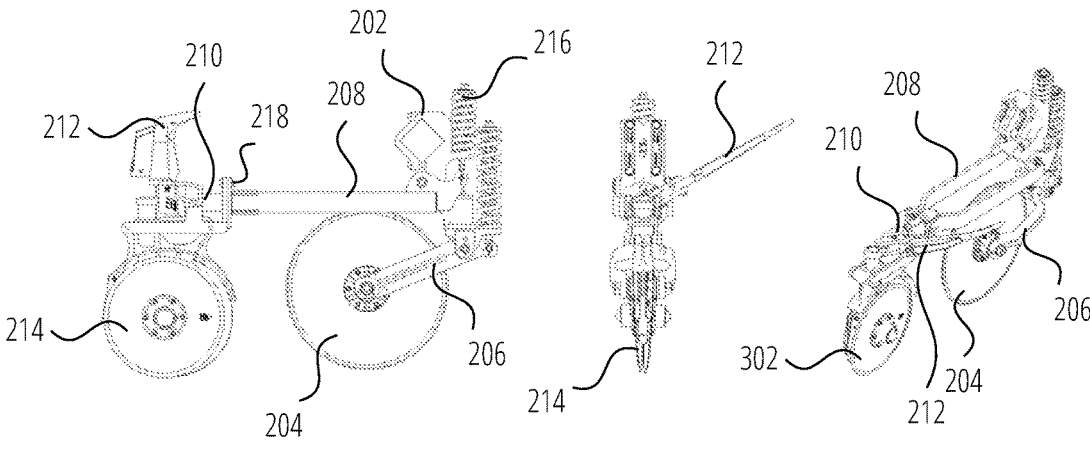
FIG. 3 illustrates, in three simplified views (a side view, a rear view, and a perspective), the row unit of FIG. 2 in another configuration.

FIG. 3 illustrates, in three simplified views (a side view, a rear view, and a perspective), the row unit 114 after rotation of the rotating support 210 by 120°, such that the double-disc 214 engages the ground and the shank 212 is oriented upward and to the right. The shank 212 does not engage the ground in this configuration.

Figure 4:
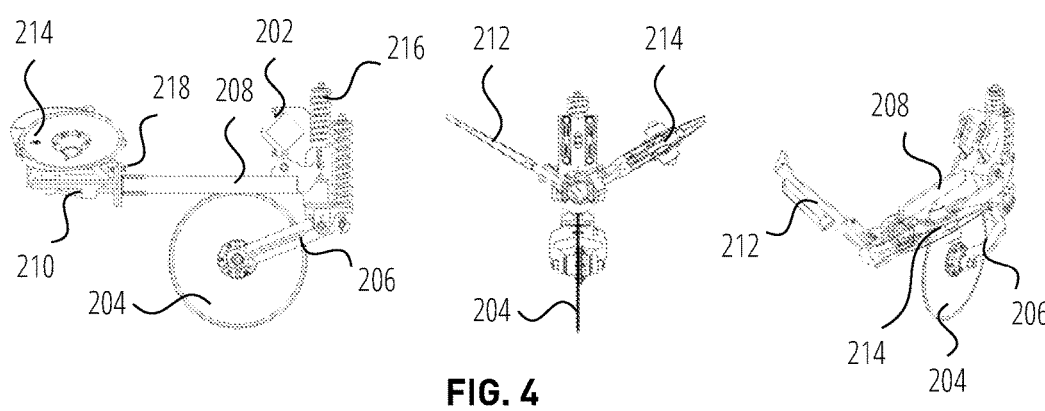
FIG. 4 illustrates, in three simplified views (a side view, a rear view, and a perspective), the row unit of FIG. 2 in yet another configuration.

FIG. 4 illustrates, in three simplified views (a side view, a rear view, and a perspective), the row unit 114 after rotation of the rotating support 210 by another 120°, such that the neither shank 212 nor the double-disc 214 engages the ground. The angle of rotation between the configurations shown in FIG. 2, FIG. 3, and FIG. 4 may be any selected angle. For example, if there are included three different ground-engaging tools, and an option for no tool is also desired, the angle between each adjacent tool may be about 90°. Furthermore, the angle between adjacent ground-engaging tools may be selected based on the size of each of the ground-engaging tools (e.g., the shank 212 and the double-disc 214), or any other factor.

In some agricultural fields, depending on soil moisture, residue content, terrain, or other factors, it may be beneficial to deliver dry fertilizer using the shank 212 or the double-disc 214. In conventional implements, fertilizer row units or portions thereof (e.g., a shank) may be removed and replaced with different row units or portions (e.g., double-discs). Such a change can be time-consuming and labor-intensive because each row unit must be individually modified. Furthermore, this change typically requires handheld tools (e.g., wrenches to loosen and tighten bolts), and the parts removed must be stored until they are needed again.

The implement 104 having row units 114 as shown herein may alleviate some of these problems. For instance, in some embodiments, each of the rotating supports 210 may be secured in position relative to the corresponding tool support 208 by a locking pin 218. An operator may, in just a few minutes, remove each locking pin 218, rotate each rotating support 210 so that a different ground-engaging tool is down, and replace each locking pin 218. Instead of hours of work time (typically in a shop), the operator can reconfigure many row units 114 without tools. This reconfiguration can even be done in a field because all of the parts are attached to the row unit 114. Reconfiguration of the row units 114 may change where or how fertilizer is delivered from the hopper 116 to the field, and thus, may impact the crop yield of the field. Because the change can be made relatively quickly, different field conditions can be addressed to improve fertilizer delivery, and therefore, crop yield.

Figure 5:
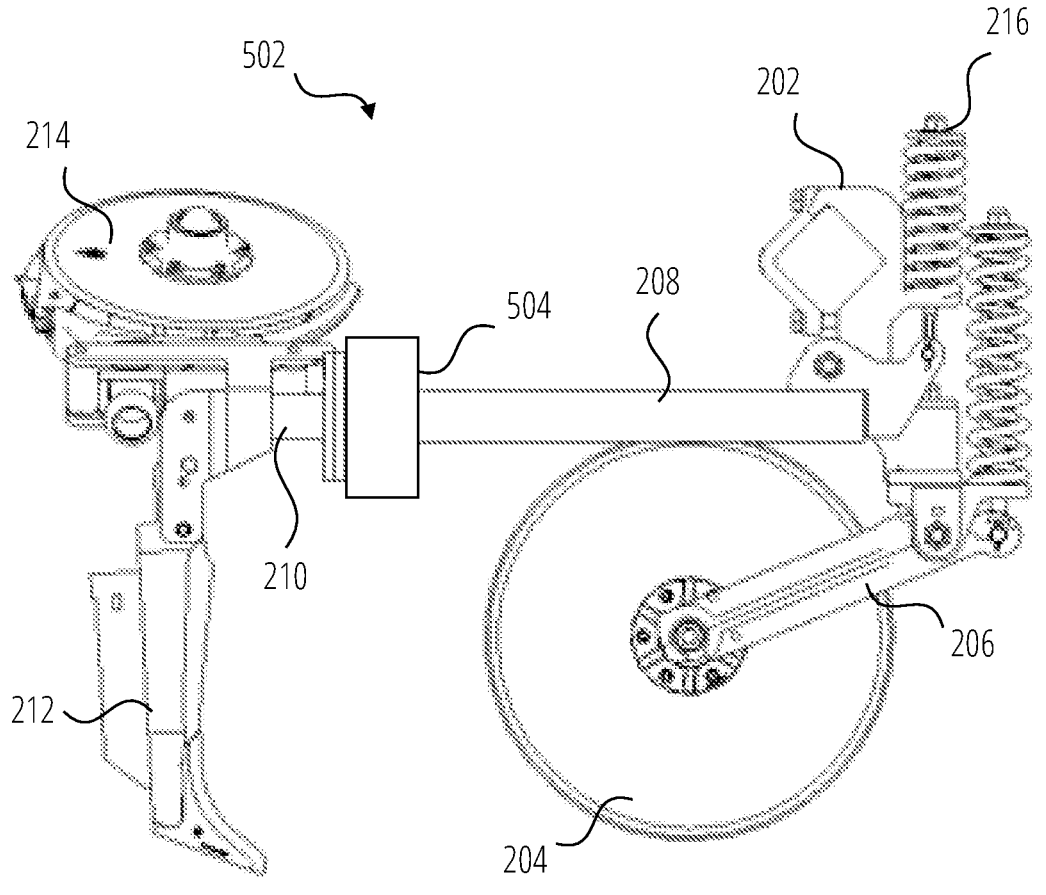
FIG. 5 illustrates an aspect of the subject matter in accordance with one embodiment.

FIG. 5 is a simplified side view of another row unit 502 that may be used with the implement 104. The row unit 502 is similar to the row unit 114, except that the row unit 502 includes an actuator 504 configured to rotate the rotating support 210. The actuator 504 may be controllable from the operator cabin 122 of the tractor 102 (e.g., with the computer 120), from a control panel on the implement 104, or from another control system. The actuator 504 is configured to change which of the ground-engaging tools 212, 214 (if any) will contact the ground. The actuator 504 may be a rotary actuator, such as an electric actuator, a hydraulic actuator, or a pneumatic actuator.

To change the ground-engaging tools that are used in a field, the row units 114, 502 may first disengage from the ground surface, typically by raising the toolbar 112 or individual row units 114, 502. The rotating supports 210 are then rotated to a selected position. In the case of the row unit 502, this may be performed by sending a control signal to the actuator 504, such as from the computer 120 in the operator cabin 122. In the case of the row unit 114, rotation is performed by manually removing the locking pin 218, rotating the rotating support 210, and reinstalling the locking pin 218. The row units 114, 502 are then re-engaged with the ground surface.

Additional non-limiting example embodiments of the disclosure are described below.

Embodiment 1: An agricultural implement, comprising a frame carrying a toolbar, and a plurality of row units coupled to the toolbar. Each row unit comprises a tool support, a rotating support coupled to the tool support and configured to rotate about an axis of rotation, and a plurality of ground-engaging tools carried by the rotating support and extending outward from the axis of rotation. Rotation of the rotating support about the axis of rotation moves the ground-engaging tools around the rotating support.

Embodiment 2: The agricultural implement of Embodiment 1, wherein the plurality of ground-engaging tools comprises at least one tool selected from the group consisting of a shank and a double-disc.

Embodiment 3: The agricultural implement of Embodiment 2, wherein the plurality of ground-engaging tools comprises both a shank and a double-disc.

Embodiment 4: The agricultural implement of any one of Embodiment 1 through Embodiment 3, further comprising a locking pin configured to lock rotation of the rotating support about the axis of rotation.

Embodiment 5: The agricultural implement of any one of Embodiment 1 through Embodiment 3, further comprising an actuator configured to cause rotation of the rotating support about the axis of rotation.

Embodiment 6: The agricultural implement of Embodiment 5, wherein the actuator is selected from the group consisting of an electric actuator, a hydraulic actuator, and a pneumatic actuator.

Embodiment 7: The agricultural implement of any one of Embodiment 1 through Embodiment 6, wherein the toolbar is supported by at least one wheel.

Embodiment 8: The agricultural implement of any one of Embodiment 1 through Embodiment 7, further comprising a hopper carried by the frame and configured to supply material to each of the row units.

Embodiment 9: The agricultural implement of Embodiment 8, wherein each of the row units is configured to dispense solid material from the hopper.

Embodiment 10: The agricultural implement of any one of Embodiment 1 through Embodiment 9, wherein the frame comprises a first section configured to be towed by a tractor, and a wing section hingedly coupled to the first section.

Embodiment 11: A method of adjusting an agricultural implement, the agricultural implement comprising a frame carrying a toolbar, and a plurality of row units coupled to the toolbar. Each row unit comprises a tool support, a rotating support coupled to the tool support, and a plurality of ground-engaging tools carried by the rotating support and extending outward from the axis of rotation. The method comprises disengaging the row units from a ground surface, rotating at least one rotating support about a corresponding axis of rotation to move the ground-engaging tools around the rotating support, and re-engaging the row units with the ground surface.

Embodiment 12: The method of Embodiment 11, further comprising removing at least one locking pin from the at least one rotating support before rotating the at least one rotating support, and reinstalling the at least one locking pin to secure the rotating support to the tool support.

Embodiment 13. The method of Embodiment 11, wherein rotating the at least one rotating support about the corresponding axis of rotation comprises causing at least one actuator to rotate the at least one rotating support.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. An agricultural implement, comprising:
a frame carrying a toolbar; and
a plurality of row units coupled to the tool bar, each row unit comprising:
a tool support;
a rotating support coupled to the tool support and configured to rotate about an axis of rotation generally aligned in a forward-to-back direction of the implement; and
first and second ground-engaging tools carried by the rotating support and extending outward from the axis of rotation, wherein rotation of the rotating support about the axis of rotation moves the ground-engaging tools around the rotating support between a first position in which the first ground-engaging tool contacts the ground, a second position in which the second ground-engaging tool contacts the ground, and a third position in which neither of the first nor second ground-engaging tools contact the ground.

2. The agricultural implement of claim 1, wherein the first ground-engaging tool comprises at least one tool selected from the group consisting of a shank and a double-disc.

3. The agricultural implement of claim 1, wherein the first ground-engaging tool comprises a shank and the second ground-engaging tool comprises a double-disc.

4. The agricultural implement of claim 1, further comprising a locking pin configured to lock rotation of the rotating support about the axis of rotation.

5. The agricultural implement of claim 1, further comprising an actuator configured to cause rotation of the rotating support about the axis of rotation.

6. The agricultural implement of claim 5, wherein the actuator is selected from the group consisting of an electric actuator, a hydraulic actuator, and a pneumatic actuator.

7. The agricultural implement of claim 1, wherein the toolbar is supported by at least one wheel.

8. The agricultural implement of claim 1, further comprising a hopper carried by the frame and configured to supply material to each of the row units.

9. The agricultural implement of claim 8, wherein each of the row units is configured to dispense solid material from the hopper.

10. The agricultural implement of claim 1, wherein the frame comprises: a first section configured to be towed by a tractor; and a wing section hingedly coupled to the first section.

11. A method of adjusting an agricultural implement, the agricultural implement comprising:
a frame carrying a toolbar; and
a plurality of row units coupled to the tool bar, each row unit comprising:
a tool support;
a rotating support coupled to the tool support with an axis of rotation generally aligned in a forward-to-back direction of the implement; and
first and second ground-engaging tools carried by the rotating support and extending outward from the axis of rotation;
the method comprising:
disengaging the row units from a ground surface;

rotating at least one rotating support about a corresponding axis of rotation to move the ground-engaging tools around the rotating support between a first position in which the first ground-engaging tool contacts the ground, a second position in which the second ground-engaging tool contacts the ground, and a third position in which neither the first nor the second ground-engaging tool contacts the ground; and re-engaging the row units with the ground surface.

12. A method of adjusting an agricultural implement, the agricultural implement comprising:

a frame carrying a toolbar; and a plurality of row units coupled to the toolbar, each row unit comprising:

a tool support;

a rotating support coupled to the tool support with an axis of rotation generally aligned in a forward-to-back direction of the implement; and a plurality of ground-engaging tools carried by the rotating support and extending outward from the axis of rotation;

the method comprising:

disengaging the row units from a ground surface;

removing at least one locking pin from the at least one rotating support;

rotating at least one rotating support about a corresponding axis of rotation after removing the at least one locking pin to move the ground-engaging tools around the rotating support to change between a plurality of positions, the plurality of positions comprising one position in which no ground-engaging tool engages the ground surface while the row unit is engaged in the ground surface;

reinstalling the at least one locking pin to secure the rotating support to the tool support; and re-engaging the row units with the ground surface.

13. The method of claim 11, wherein rotating the at least one rotating support about the corresponding axis of rotation comprises causing at least one actuator to rotate the at least one rotating support.

14. The method of claim 12, wherein rotating the at least one rotating support about the corresponding axis of rotation comprises causing at least one actuator to rotate the at least one rotating support.

15. The method of claim 12, wherein the plurality of ground-engaging tools comprises two ground-engaging tools and the plurality of positions may be selected by rotating the rotating support approximately 120°.

16. The method of claim 12, wherein the plurality of ground-engaging tools comprises three ground-engaging tools and the plurality of positions may be selected by rotating the rotating support approximately 90°.

* * * * *